(12) United States Patent
Liu

(10) Patent No.: US 7,116,388 B2
(45) Date of Patent: Oct. 3, 2006

(54) LIQUID CRYSTAL DISPLAY PANEL HAVING INTER-DIGITAL ELECTRODES

(75) Inventor: Chen-Yu Liu, Taoyaung Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 81 days.

(21) Appl. No.: 10/784,800

(22) Filed: Feb. 24, 2004

(65) Prior Publication Data
US 2005/0052602 A1    Mar. 10, 2005

(30) Foreign Application Priority Data
Sep. 8, 2003   (TW) .............................. 92124798 A

(51) Int. Cl.
*G02F 1/1343* (2006.01)
(52) U.S. Cl. ...................... 349/141; 349/143; 349/146; 349/39
(58) Field of Classification Search ................ 349/141, 349/143, 146
See application file for complete search history.

(56) References Cited

U.S. PATENT DOCUMENTS

| | | | | |
|---|---|---|---|---|
| 5,886,762 A * | 3/1999 | Lee et al. | .................... | 349/141 |
| 6,184,946 B1 * | 2/2001 | Ando et al. | ................... | 349/42 |
| 6,256,081 B1 | 7/2001 | Lee et al. | | |
| 6,590,627 B1 * | 7/2003 | Tomioka et al. | ............ | 349/139 |
| 6,816,221 B1 * | 11/2004 | Oke et al. | .................... | 349/141 |
| 6,914,645 B1 * | 7/2005 | Kurahashi et al. | ............ | 349/43 |
| 6,927,808 B1 * | 8/2005 | Ono et al. | ..................... | 349/43 |

* cited by examiner

*Primary Examiner*—Andrew Schechter
*Assistant Examiner*—Mike Qi
(74) *Attorney, Agent, or Firm*—Nath & Associates PLLC; Gregory B. Kang; Teresa M. Arroyo

(57) ABSTRACT

Contact holes between drains and pixel electrodes, and between common lines and counter electrodes are located on the same side of the pixel region. The pixel electrodes and the counter electrodes are made of a transparent conductive material, thereby increasing a transmittance and an aperture ratio. Furthermore, the pixel electrodes and the counter electrodes are inter-digital electrodes and interlaced with each other so as to attain a wide viewing angle effect.

20 Claims, 3 Drawing Sheets

LIQUID CRYSTAL DISPLAY PANEL HAVING INTER-DIGITAL ELECTRODES

CROSS REFERENCE TO RELATED APPLICATION

This application claims priority from Taiwanese Patent Application No. 092124798, filed on Sep. 8, 2003.

BACKGROUND OF THE INVENTION

1. Field of the Invention

This invention relates to a liquid crystal display (LCD) panel, and more particularly to a LCD panel having a planar insulating layer, a counter electrode and a pixel electrode, wherein both electrodes are made of a transparent conductive material, such that the aperture ratio of the LCD panel may be efficiently increased, and that the interaction between the electrodes may be decreased.

2. Description of the Prior Art

Liquid crystal molecules in a liquid crystal display (LCD) device have optical anisotropy and chiral properties. The liquid crystal molecules have an orientation order in alignment resulting from their thin and long shapes. The alignment direction of the liquid crystal molecules can be controlled by applying an electric field there to. In other words, as the electric field is changed, the alignment direction of the liquid crystal molecular is changed. The incident light is refracted to the alignment direction of the liquid crystal molecular owing to the optical anisotropy of the liquid crystal molecules. Therefore, the LCD device can display an image by means of two polarizers and the liquid crystal molecules.

In most of the conventional LCD devices, the alignment of the liquid crystal is controlled by applying a vertical electric field. Such mechanism has the advantages of high transmittance and high aperture ratio. However, the disadvantage of such an LCD lies in a narrow viewing angle. To overcome the problem of the narrow viewing angle, an in-plane switching (IPS) LCD panel has been developed. In the IPS LCD panel, the alignment of liquid crystal is controlled by an electric field parallel to the LCD panel. Such mechanism is different from the LCD panel mentioned above as the Twisted Nematic (TN) or Super Twisted Nematic (STN) LCD panel. The electric field applied to the IPS LCD device is lateral because the pixel and common electrodes thereof are formed on the same substrate in the IPS LCD device. The advantages of the IPS LCD device lie in a wide viewing angle and low color dispersion.

The IPS LCD device usually comprises separate and parallel upper and lower substrates and liquid crystal molecules positioned in between. On the lower substrate or array substrate, a pixel electrode and a common electrode are formed, separately and parallel to each other. The alignment of the liquid crystal is changed by the lateral electric field generated between the pixel and common electrodes. However, the conventional IPS LCD device uses opaque metal as the pixel and counter electrode material, as disclosed in US Publication No. 2002-0158994. The US Publication No. 2002-0158994 discloses a manufacturing method of liquid crystal display device, and one pixel portion of the LCD device is shown in FIG. 1. The pixel portion comprises a drain line A, a drain electrode H, a gate line M, a common electrode B, a pixel electrode (drain layer) F, counter electrode (indium tin oxide, ITO) C, a pixel electrode (ITO) D, a source electrode K, and a thin film transistor (TFT) positioned near the intersection portion among the source electrode K, the drain electrode H, and a semiconductor layer L. Therein, the pixel portion further comprises a contact hole G for the pixel electrode F, and a contact hole J for the counter electrode C. Although the LCD device could provide a wide viewing angle, simplified process and high reliability, the pixel electrode F in the pixel is made of opaque conductive metal, which may result in a low aperture ratio and may affect the brightness of the LCD device.

Accordingly, an IPS LCD device still needs to be improved in its aperture ratio and brightness.

SUMMARY OF THE INVENTION

One object of the present invention is to provide a liquid crystal display panel with a high aperture ratio.

Another object of the present invention is to provide a liquid crystal display panel for decreasing the influence of vertical electric field and increasing a tolerance for an alignment process.

A further object of the present invention is to provide a liquid crystal display panel with a planar insulating layer. Such layer can improve surface flatness and decrease the influence of electric line induced by lower metal wires on the liquid crystal.

As mentioned above, the present invention also provides a liquid crystal display panel. The liquid crystal display panel comprises an upper substrate, a lower substrate, a plurality of common lines, a plurality of gate lines, an insulating layer, a semiconductor layer, a plurality of sources, a plurality of drains, a passivation layer, a plurality of data lines, a plurality of transparent inter-digital pixel electrodes, and a plurality of transparent inter-digital counter electrodes. The lower substrate is parallel to the upper substrate and the liquid crystal layer is between the upper substrate and the lower substrate. The plurality of common lines and the plurality of gate lines are formed on the substrate and are parallel to each other. The insulating layer is formed on the substrate, the common lines, and the gate lines. The semiconductor layer is formed on the insulating layer and is above the gate lines. The plurality of sources and the plurality of drains are respectively formed on the two sides of the semiconductor layer above one corresponding gate line. The passivation layer is formed on the space, the plurality of sources, the plurality of drains, and the insulating layer. The plurality of data lines is formed on the insulating layer, perpendicular to the plurality of gate lines, and electrically connected to one corresponding source. The plurality of transparent inter-digital pixel electrodes is formed on the passivation layer. Each of the transparent inter-digital pixel electrodes has first fingers that extend in the direction parallel to the data lines and is electrically connected to one corresponding drain through at least one first contact hole. The plurality of transparent inter-digital counter electrodes is formed on the passivation layer. One side of each of the transparent inter-digital pixel counter electrodes has second fingers that extend in the direction parallel to the data lines and are electrically connected to the corresponding common line through at least one second contact hole. A pixel region is defined by one of the data lines and one of the gate lines, the first contact hole and the second contact hole are on the same side of the pixel region, and the first fingers and the second fingers are interlaced in the pixel region.

As mentioned above, the present invention also provides a liquid crystal display panel. The liquid crystal display panel comprises an upper substrate, a lower substrate, a plurality of common lines, a plurality of gate lines, an insulating layer, a semiconductor layer, a plurality of sources, a plurality of drains, a passivation layer, a plurality of data lines, a plurality of transparent inter-digital pixel electrodes, and a plurality of transparent inter-digital counter electrodes. The lower substrate is parallel to the upper substrate and the liquid crystal layer is between the upper substrate and the lower substrate. The plurality of common lines and the plurality of gate lines are formed on the substrate and are parallel to each other. The insulating layer is formed on the substrate, the common lines, and the gate lines. The semiconductor layer is formed on the insulating layer and is above the gate lines. The plurality of sources and the plurality of drains are respectively formed on the two sides of the semiconductor layer above one corresponding gate line. The passivation layer is formed on the space, the plurality of sources, the plurality of drains, and the insulating layer. The plurality of data lines is formed on the insulating layer, perpendicular to the plurality of gate lines, and electrically connected to one corresponding source. The plurality of transparent inter-digital pixel electrodes is formed on the passivation layer. Each of the transparent inter-digital pixel electrodes has first fingers that extend in the direction parallel to the data lines and is electrically connected to one corresponding drain through at least one first contact hole. The plurality of transparent inter-digital counter electrodes is formed on the passivation layer. Each of the transparent inter-digital pixel electrodes has second fingers that extend in the direction parallel to the data lines and are electrically connected to the corresponding common line through at least one second contact hole. A pixel region is defined by one of the data lines and one of the gate lines, the first contact hole and the second contact hole are on the same side of the pixel region, and the first fingers and the second fingers are interlaced in the pixel region.

DESCRIPTION OF THE PREFERRED EMBODIMENT

To achieve the above objects and advantages, the present invention provides a liquid crystal display panel, which comprises at least a substrate, a gate line and a data line defining a pixel region on the substrate, a thin film transistor (TFT), a common line, a passivation layer, an inter-digital pixel electrode, and an inter-digital counter electrode. The inter-digital pixel electrode and the inter-digital counter electrode are formed on the passivation layer. The TFT is positioned near an intersection portion of the gate line and the data line. The pixel and the counter electrodes can be made of a transparent conductive material such as indium tin oxide (ITO), indium zinc oxide (IZO), or the combination thereof. Therefore, a transmittance of a pixel region will be increased. In other words, an aperture ratio will be increased to obtain a better transmittance. In a liquid crystal display panel of the present invention, fingers of the pixel and the counter electrodes extend to the pixel region, and they are interlaced and extend in the direction parallel to the data line to achieve an effect of in-plane switching wide viewing angle. Moreover, the planar insulating layer is optionally formed on the passivation layer to increase the surface flatness of the LCD TFT substrate and decrease the abnormal arrangement of the liquid crystal resulting from the uneven flatness so as to increase the brightness.

According to the liquid crystal display panel of the present invention, the counter and pixel electrodes may be a zigzag, a linear, or in any other shape, and are interlaced with each other to generate an electric field parallel to the substrate. However, for generating multi-domain orientation of the liquid crystal to decrease color shift, it is preferred that the counter and pixel electrodes are formed in a zigzag shape.

The present invention will be described in more detail by reference to the accompanied drawings. However, the embodiments are provided only for illustration and are not to limit the scope of the present invention. The LCD panel of the present invention comprises separate and parallel upper and lower substrates, and a liquid crystal layer positioned in between, as indicated in the above description of the prior art. The following descriptions of embodiments aim at the structure of the lower substrate.

Figure 1:
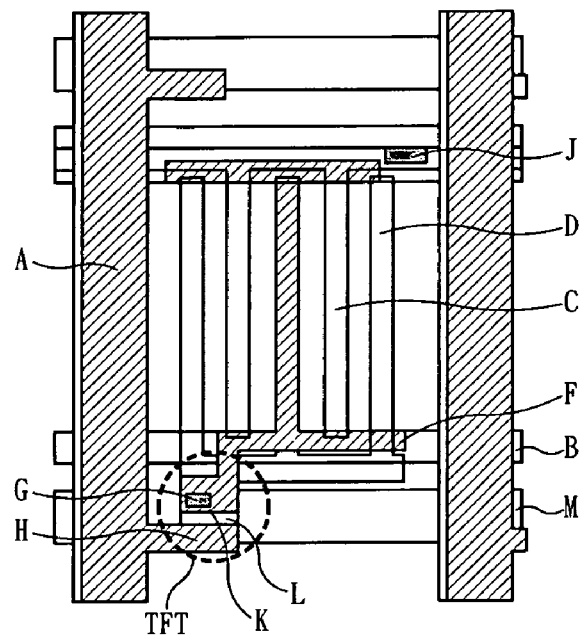
FIG. 1 shows a schematic view of a conventional pixel region.
Figure 2:
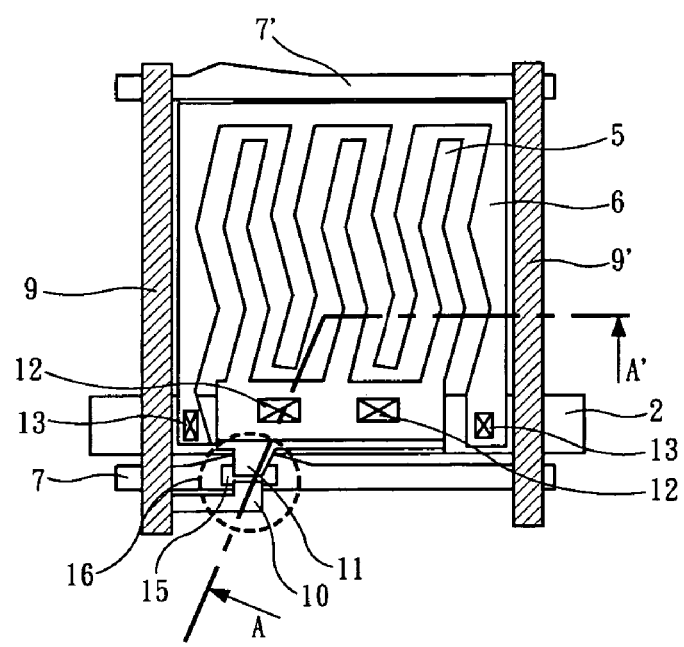
FIG. 2 shows a schematic view of the pixel region according to one embodiment of the present invention.
Figure 3:
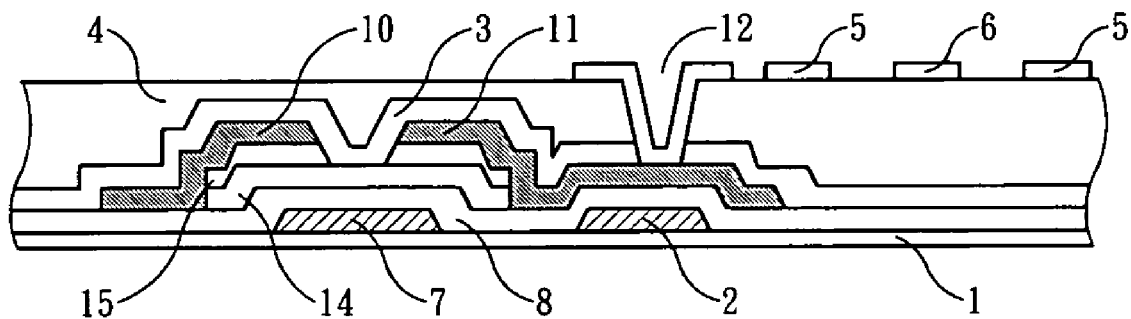
FIG. 3 shows a cross-sectional view along line A–A' in the liquid crystal display panel of the present invention as shown in FIG. 2.

Now please refer to FIG. 2 and FIG. 3. FIG. 2 shows a schematic view of the pixel portion according to one embodiment of the present invention. FIG. 3 shows a cross-sectional view along line A–A' in the liquid crystal display panel of the present invention as shown in FIG. 2. As shown in FIG. 2 and FIG. 3, the liquid crystal display panel of the present invention comprises a lower substrate 1, a common line 2, a passivation layer 3, a planar insulating layer 4, an inter-digital pixel electrode 5, an inter-digital counter electrode 6, a gate line 7, a data line 9, and a thin film transistor 16. The planar insulating layer 4 is formed on the passivation layer 3. The inter-digital pixel electrode 5 and the inter-digital counter electrode 6 are formed on the planar insulating layer 4. The thin film transistor (TFT) 16 is positioned near an intersection portion of the gate line 7 and the data line 9.

Please refer to FIG. 2 and FIG. 3, the gate line 7 is formed on the lower substrate 1. As shown in FIG. 3, an insulating layer 8 is covered on the gate line 7 and the common line 2. Herein, an amorphous silicon layer 14 and a doped amorphous silicon layer 15 are sequentially formed on the insulating layer 8. The doped amorphous silicon layer 15 is divided into two portions. A source 10 and a drain 11 are symmetric to the gate line 7 and formed respectively on the two portions of the doped amorphous silicon layer 15. The data line 9 is formed on the insulating layer 8 in one edge of the pixel region and perpendicular to the gate line 7. Also, the data line 9 is connected to the source 10. Two gate lines 7,7' and two data lines 9,9' are crossed with each other and define the region of pixel. The drain 11 electrically connects to the pixel electrode 5 through contact holes 12, and the common line 2 electrically connects to the counter electrode 6 through contact holes 13. Furthermore, the counter electrode 6 and the pixel electrode 5 are zigzag and interlaced. Also, the contact holes 12 and 13 are located on the same side of the pixel region. Moreover, the profile of counter electrode 6 has a "Π" shape surrounding the pixel region and its finger portion extends into the pixel region.

Additionally, the pixel electrode 5 and the counter electrode 6 are both made of a transparent conductive material, such as indium-tin oxide (ITO) or indium-zinc oxide (IZO). Thereby, a pixel with a better transmittance will be obtained. The finger portions of the pixel electrode 5 and the counter electrode 6 extending to the pixel region are inter-digital, and interlaced with each other along the direction parallel to the data line 9. In order to improve the surface flatness, a planar insulating layer 4 is optionally formed on the passivation layer 3, and the pixel electrode 5 and the counter electrode 6 are formed on the planar insulating layer 4, as shown in FIG. 2. The planar insulating layer 4 can decrease abnormal orientation of the liquid crystal resulted from uneven surface, as well as insulation charateristic, so electrical lines induced by lower metal wires will be decreased to avoid affecting the alignment of liquid crystal.

The common line 2 made of an opaque metal is formed on one side of the pixel region and neighbored to either the gate line 7 (as shown in FIG. 2) or the data line 9. The common line 2 is positioned near the edge of the pixel region without passing through or dividing an area of the pixel region into which the light penetrates. Therefore, an aperture ratio and the brightness of the LCD panel will be increased. The opaque material of the common line 2 can be aluminum (Al), aluminum neodymium alloy (AlNd), tungsten (W), molybdenum (Mo), or the combination thereof.

Figure 5:
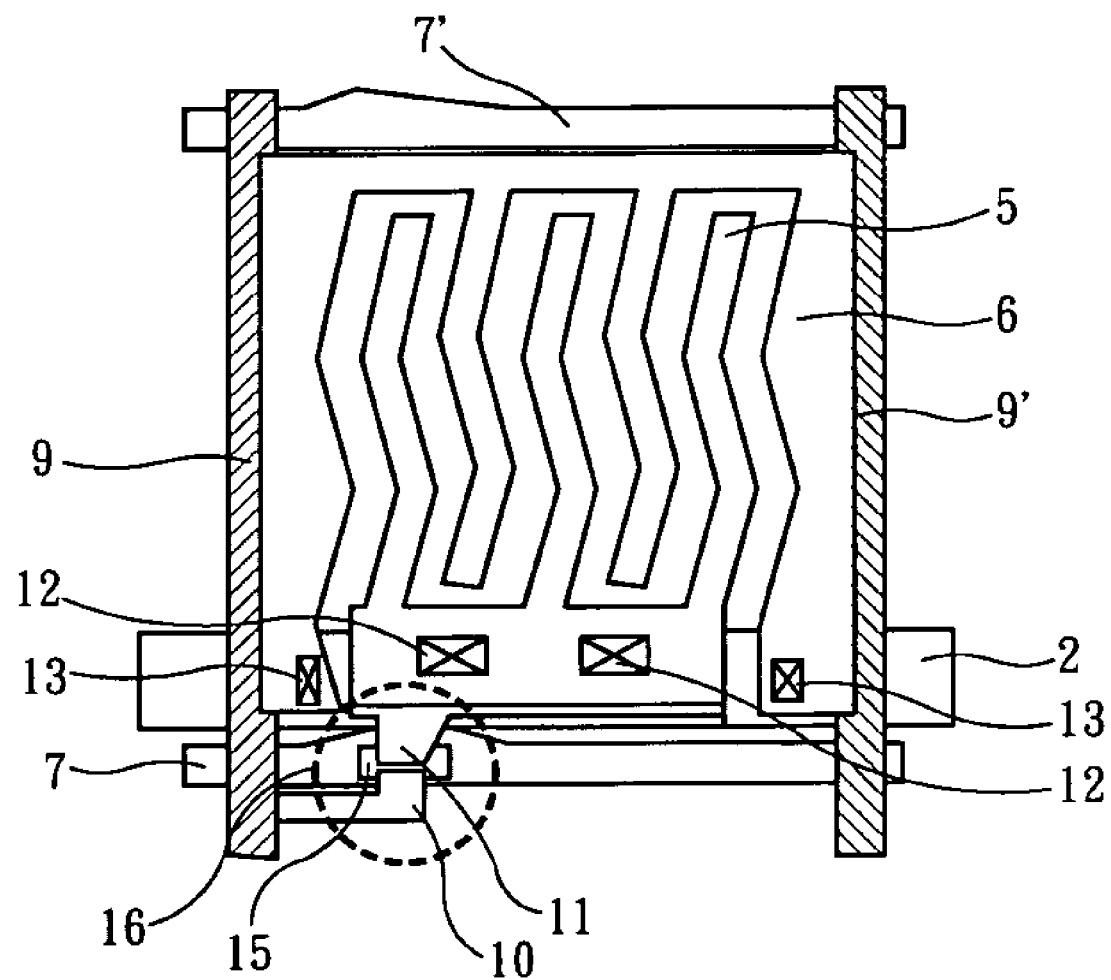
FIG. 5 shows a schematic view of the pixel region, in which the counter electrode overlaps the data lines according to one embodiment of the present invention.

Furthermore, the counter electrode 6 may or may not overlap the data lines 9,9'. For example, as shown in FIG. 2, in the pixel region, the counter electrode 6 may not overlap the data lines 9,9'. When the counter electrode 6 overlaps the data lines 9,9' as shown in FIG. 5, the range of the lateral electric field will further be expanded, so the aperture ratio will be increased.

Figure 4:
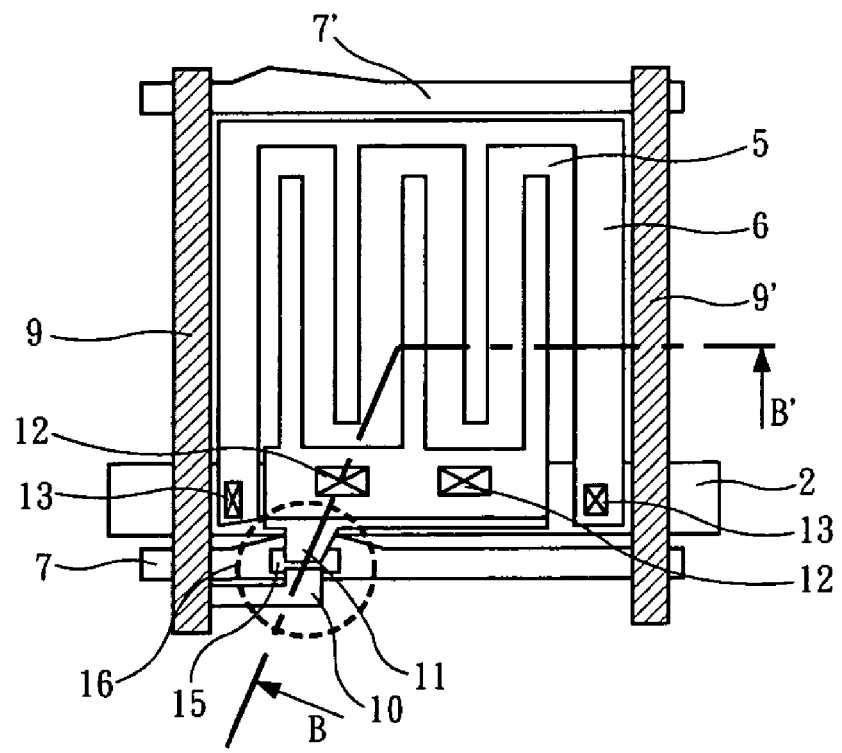
FIG. 4 shows a schematic view of the pixel region according to another embodiment of the present invention.

FIG. 4 shows a schematic view of the pixel region according to another embodiment of the present invention. The liquid crystal display panel of the present invention comprises a lower substrate 1, a common line 2, a passivation layer 3, a planar insulating layer 4, an inter-digital pixel electrode 5, an inter-digital counter electrode 6, a gate line 7, a data line 9, and a thin film transistor (TFT) 16. The planar insulating layer 4 is formed on the passivation layer 3. The inter-digital pixel electrode 5 and the inter-digital counter electrode 6 are formed on the planar insulating layer 4. The thin film transistor 16 is positioned near an intersection portion of the gate line 7 and the data line 9.

A cross-sectional view along line B–B' in FIG. 4 is similar to the cross-sectional view along line A–A' in FIG. 2, as shown in FIG. 3. Therefore, the cross-sectional view along line B–B' of FIG. 4 is described by FIG. 3 below. The gate line 7 is formed on the lower substrate 1, and the gate line 7 and the common line 2 are covered with an insulating layer 8. Herein, an amorphous silicon layer 14 and a doped amorphous silicon layer 15 are sequentially formed on the insulating layer 8. The doped amorphous silicon layer 15 is divided into two portions. A source 10 and a drain 11 are formed respectively on the two portions of the doped amorphous silicon layer 15. The data line 9 is formed on the insulating layer 8 in one edge of the pixel, perpendicular to the gate line 7, and connected to the source 10. Two gate lines 7,7' and two data lines 9,9' are crossed with each other and define the region of pixel. The drain 11 electrically connects to the pixel electrode 5 through contact holes 12, and the common line 2 electrically connects to the counter electrode 6 through contact holes 13. Furthermore, the counter electrode 6 and the pixel electrode 5 are linear and interlaced with each other. Also, the contact holes 12 and the contact holes 13 are located on the same side of the pixel region. Moreover, the profile of counter electrode 6 has a "Π" shape surrounding the pixel region and its finger portion extends into the pixel region.

Additionally, the pixel electrode 5 and the counter electrode 6 are both made of a transparent conductive material. The finger portions of the pixel electrode 5 and the counter electrode 6 extending to the pixel region are inter-digital, and interlaced with each other along the direction parallel to the data line 9. In order to improve the surface flatness, a planar insulating layer 4 is optionally formed on the passivation layer 3, and then the pixel electrode 5 and the counter electrode 6 are formed on the planar insulating layer 4.

The common line 2 made of an opaque metal is formed on one side of the pixel region and neighbored to either the gate line 7 (as shown in FIG. 4) or the data line 9. The common line 2 is positioned near the edge of the pixel region without passing through or dividing an area of the pixel region into which the light penetrates. Therefore, an aperture ratio and the brightness of the LCD panel will be increased. Similarly, the opaque material of the common line 2 may be aluminum (Al), aluminum neodymium alloy (AlNd), tungsten (W), molybdenum (Mo), or the combination thereof, etc.

The present invention has been illustrated by reference to the preferred embodiments. However, the embodiments are only used to illustrate the present invention and are not to limit the scope of the present invention. Therefore, persons skilled in the field could make any modification and change without departing from the spirit and the scope of the present invention.

What is claimed is:

1. A liquid crystal display panel, comprising:
   an upper substrate;
   a lower substrate parallel to said upper substrate;
   a liquid crystal layer between said upper substrate and said lower substrate;
   a common line layer having a plurality of common lines on said lower substrate;
   a gate line layer having a plurality of gate lines parallel to said common lines on said lower substrate;
   an insulating layer on said lower substrate and said common line layer and said gate line layer;
   a data line layer having a plurality of data lines perpendicular to said gate lines on said insulating layer;
   a plurality of thin film transistors on said lower substrate, where each of said thin film transistors is positioned near a respective intersection portion of said gate lines and said data lines;
   a passivation layer on said plurality of thin film transistors and said insulating layer;
   a planar insulating layer on said passivation layer;
   a plurality of transparent inter-digital pixel electrodes on said planar insulating layer, each of said plurality of transparent inter-digital pixel electrodes having first fingers that extend in the direction parallel to said data lines and are electrically connected to one corresponding drain of said thin film transistors through at least one first contact hole; and
   a plurality of transparent inter-digital counter electrodes on said planar insulating layer, one side of each of said plurality of transparent inter-digital pixel counter electrodes having second fingers that extend in the direction parallel to said data lines and are electrically connected to one corresponding common line through at least one second contact hole;
   wherein a pixel region is defined by one of said data lines and one of said gate lines, at least one said first contact hole and at least one said second contact hole are on the same side of said pixel region, and said first fingers and said second fingers are interlaced in said pixel region.

2. The liquid crystal display panel in claim 1, wherein said plurality of transparent inter-digital pixel electrodes is ITO, IZO, or the combination thereof.

3. The liquid crystal display panel in claim 2, wherein said first fingers are zigzag.

4. The liquid crystal display panel in claim 2, wherein said first fingers are linear.

5. The liquid crystal display panel in claim 1, wherein said plurality of transparent inter-digital counter electrodes is ITO, IZO, or the combination thereof.

6. The liquid crystal display panel in claim 5, wherein said second fingers are zigzag.

7. The liquid crystal display panel in claim 5, wherein said second fingers are linear.

8. The liquid crystal display panel in claim 1, wherein the other side of said transparent inter-digital counter electrodes opposite to said side having said second fingers is near and parallel to one of said gate lines in one corresponding pixel region.

9. The liquid crystal display panel in claim 8, wherein said transparent inter-digital counter electrodes overlap said data lines in respective pixel region.

10. A liquid crystal display panel, comprising:
an upper substrate;
a lower substrate parallel to said upper substrate;
a liquid crystal layer between said upper substrate and said lower substrate;
a plurality of common lines and a plurality of gate lines on said substrate and parallel to each other;
an insulating layer on said substrate, said common lines, and said gate lines;
a semiconductor layer on said insulating layer and above said gate lines;
a plurality of sources and a plurality of drains respectively on two sides of said semiconductor layer above one corresponding gate line;
a plurality of data lines on said insulating layer perpendicular to said plurality of gate lines, and electrically connected to one corresponding source;
a passivation layer on, said plurality of sources, said plurality of drains, and said insulating layer;
a plurality of transparent inter-digital pixel electrodes on said passivation layer, each of said plurality of transparent inter-digital pixel electrodes having first fingers that extend in the direction parallel to said data lines and are electrically connected to one corresponding drain through at least one first contact hole; and
a plurality of transparent inter-digital counter electrodes on said passivation layer, one side of each of said plurality of transparent inter-digital pixel counter electrodes having second fingers that extend in the direction parallel to said data lines and are electrically connected to one corresponding common line through at least one second contact hole;
wherein a pixel region is defined by one of said data lines and one of said gate lines, at least one said first contact hole and at least one said second contact hole are on the same side of said pixel region, and said first fingers and said second fingers are interlaced in said pixel region.

11. The liquid crystal display panel in claim 10, further comprising a planar insulating layer among said passivation layer, said plurality of transparent inter-digital pixel electrodes, and said plurality of transparent inter-digital counter electrodes.

12. The liquid crystal display panel in claim 11., wherein said plurality of transparent inter-digital pixel electrodes is ITO, IZO, or the combination thereof.

13. The liquid crystal display panel in claim 12, wherein said first fingers are zigzag.

14. The liquid crystal display panel in claim 12, wherein said first fingers are linear.

15. The liquid crystal display panel in claim 11, wherein the other side of said transparent inter-digital counter electrodes opposite to said side having said second fingers is near and parallel to one of said gate lines in one corresponding pixel region.

16. The liquid crystal display panel in claim 15, wherein said transparent inter-digital counter electrodes in said pixel region overlap said data lines in respective pixel region.

17. The liquid crystal display panel in claim 11, wherein said plurality of transparent inter-digital counter electrodes is ITO, IZO, or the combination thereof.

18. The liquid crystal display panel in claim 17, wherein said second fingers are zigzag.

19. The liquid crystal display panel in claim 17, wherein said second fingers are linear.

20. The liquid crystal display panel in claim 10, further comprising a doped amorphous silicon layer having two portions that are between said insulating layer and said plurality of sources, and between said insulating layer and said plurality of drains respectively.

* * * * *